United States Patent
Fujieda et al.

(10) Patent No.: US 9,020,614 B2
(45) Date of Patent: Apr. 28, 2015

(54) PLANT CONTROL SYSTEM

(75) Inventors: Hiroyuki Fujieda, Tokyo (JP); Akira Nojima, Tokyo (JP)

(73) Assignee: Toshiba Mitsubishi-Electric Industrial Systems Corporation, Minato-Ku, Tokyo (JP)

( * ) Notice: Subject to any disclaimer, the term of this patent is extended or adjusted under 35 U.S.C. 154(b) by 451 days.

(21) Appl. No.: 13/382,945

(22) PCT Filed: Sep. 28, 2009

(86) PCT No.: PCT/JP2009/066786
§ 371 (c)(1),
(2), (4) Date: Jan. 9, 2012

(87) PCT Pub. No.: WO2011/036799
PCT Pub. Date: Mar. 31, 2011

(65) Prior Publication Data
US 2012/0116543 A1    May 10, 2012

(51) Int. Cl.
*G05B 15/02* (2006.01)
*G05B 15/00* (2006.01)
*G05B 19/042* (2006.01)

(52) U.S. Cl.
CPC .... *G05B 19/042* (2013.01); *G05B 2219/24215* (2013.01)

(58) Field of Classification Search
CPC ............. G05B 19/05; G05B 2219/24215; G05B 19/042
USPC ........................................ 700/9, 83
See application file for complete search history.

(56) References Cited

U.S. PATENT DOCUMENTS

| 4,419,667 | A | 12/1983 | Gurr et al. |
| 5,490,134 | A * | 2/1996 | Fernandes et al. ............ 370/466 |
| 6,799,080 | B1 * | 9/2004 | Hylden et al. ................. 700/97 |
| 7,142,556 | B1 | 11/2006 | Smith |

(Continued)

FOREIGN PATENT DOCUMENTS

| JP | 9-101808 A | 4/1997 |
| JP | 2001-337706 A | 12/2001 |
| JP | 2007-504570 A | 3/2007 |

OTHER PUBLICATIONS

"Motion Detector—Retriggerable Single Shot KRD9 Digi-Timer Time Delay Relay", (Aug. 15, 2006).*

(Continued)

*Primary Examiner* — Mohammad Ali
*Assistant Examiner* — Yuhui R Pan
(74) *Attorney, Agent, or Firm* — Leydig, Voit & Mayer, Ltd.

(57) ABSTRACT

A plant control system carrying out a single shot output without adding a program concerning signal transfer between a supervisory control device and a programmable logic controller to the supervisory control device and the programmable logic controller. The plant control system includes a single shot output functioning section which causes a SCADA system connected to a programmable controller for controlling the plant to send a control signal corresponding to control content of a selected plant to the programmable controller, and, thereafter, to send an erasure signal for erasing the control signal held in the programmable controller to the programmable controller. The single shot output functioning section is outside of the SCADA system and outside of the programmable controller.

2 Claims, 8 Drawing Sheets

(56) References Cited

U.S. PATENT DOCUMENTS 7,386,586 B1 * 6/2008 Headley et al. ............... 709/202
2007/0156253 A1 * 7/2007 De Silvio ........................ 700/6

OTHER PUBLICATIONS

Shankar et al. "Control of Boiler Operation using PLC—SCADA" from "Proceedings of the International MultiConference of Engineers and Computer Scientists 2008 vol. II, IMECS 2008, Mar. 19-21, 2008, Hong Kong".*

Taiwanese Patent Office, Office Action in Taiwanese Patent Application No. 098142678 (Dec. 26, 2012).

The International Bureau of WIPO, English translation of International Preliminary Report on Patentability in International Patent Application PCT/JP2009/066786, (Apr. 11, 2012).

* cited by examiner

Fig. 8

PLANT CONTROL SYSTEM

TECHNICAL FIELD

The present invention relates to a plant control system that controls a plant.

BACKGROUND ART

In the conventional plant control system, a plant is controlled by a programmable logic controller. This programmable logic controller is connected to a supervisory control device via a scan transmission device. The programmable logic controller and the supervisory control device transfer data from one to another.

In this plant control system, a SCADA system is used for the supervisory control device. In this SCADA system, a plurality of monitoring screens are prepared. On each of the monitoring screens, parts such as control operating buttons and indicating lamps are arranged. Also, in the SCADA system, an internal tag is used as an internal signal. Further, in the SCADA system, an I/O (input/output) tag is used as a signal for transferring data to and from the programmable logic controller.

In the plant control system configured as described above, in some cases, the plant is controlled from the supervisory control device. In this case, an operator depresses the control operating button or the like displayed on the SCADA system. Thereby, an I/O tag corresponding to the control operating button or the like is selected. Thereafter, an acknowledge button such as an execution button is depressed. Thereby, the selected I/O tag is turned ON. The ON-state I/O tag is transmitted to the programmable logic controller.

If this ON state is controlled as it is on the scan transmission device, in some cases, the selected I/O tag does not reach the programmable logic controller on account of wire breaking of the scan transmission device or other causes. In this case, the programmable logic controller misjudges that the selected I/O tag has been turned OFF. To prevent this misjudgment, usually, the programmable logic controller detects a change of the selected I/O tag, and holds the ON state of the selected I/O tag.

The I/O tag held in the ON state must be turned OFF before the next operation of the control operating button or the like. One method for turning off the I/O tag is to execute, in the SCADA system, a program for issuing a command to turn OFF the selected I/O tag after certain time has elapsed, and to deliver a command signal to the programmable logic controller. The output of a command signal for turning OFF the I/O tag after the certain time has elapsed from when the I/O tag was turned ON is called a single shot output.

In the above-described configuration, to hold the selected I/O tag in the SCADA system, an internal tag is needed for each of the control operating buttons. Also, an internal tag for a counter that counts the certain time with the depression of the acknowledge button being the basis is needed for each of the control operating buttons. Therefore, as the number of control operating buttons increases, the number of internal tags increases greatly. Accordingly, the number of programs written in the SCADA system also increases. This presents a problem that the preparation of single shot output requires a lot of programs and internal tags. As the result of this problem, there arise problems of deteriorated performance of the SCADA system, decreased reliability caused by program mistakes, increased amount of work at the time of addition/deletion of signals, and the like. Further, because the number of tags is limited, a large-scale plant control system has a problem that the internal tags are exhausted.

To solve the above-described problems, various proposals have been made. For example, there has been proposed a method in which the SCADA system receives a response signal with respect to signal reception from the programmable logic controller, whereby the signal output from the SCADA system is turned OFF. Thereby, the programs written in the SCADA system can be reduced (for example, refer to Patent Literature 1).

CITATION LIST PATENT LITERATURE

Patent Literature 1: Japanese Patent No. 3369367

SUMMARY OF INVENTION

Technical Problem

Unfortunately, in the system described in Patent Literature 1, a program for single shot output must be written in the programmable logic controller. Also, judgment must be made including the judgment as to from which supervisory control device the I/O tag has been sent. That is, as the number of control operating buttons increases, the number of programs in the programmable logic controller increases. This presents problems of deteriorated performance of the programmable logic controller, decreased reliability caused by program mistakes, increased amount of work at the time of addition/deletion of signals, and the like.

The present invention has been made to solve the above-described problems, and accordingly an object thereof is to provide a plant control system capable of carrying out a single shot output to a supervisory control device and a programmable logic controller without adding a program concerning the signal transfer between the supervisory control device and the programmable logic controller.

Means for Solving the Problems

A plant control system of the present invention includes a single shot output functioning section which causes a SCADA system connected to a programmable controller for controlling the plant to send a control signal corresponding to a control content of a selected plant to the programmable controller, and thereafter to send an erasure signal for erasing the control signal held in the programmable controller to the programmable controller, wherein the single shot output functioning section is on the outside of the SCADA system and on the outside of the programmable controller.

Advantageous Effect of Invention

According to the present invention, a single shot output can be carried out to a supervisory control device and a programmable logic controller without the addition of a program concerning the signal transfer between the supervisory control device and the programmable logic controller.

BRIEF DESCRIPTION OF THE DRAWINGS

FIG. 8 is the rear half part of the timing chart for explaining the operation of the plant control system in accordance with the fourth embodiment of the present invention.

DESCRIPTION OF EMBODIMENTS

Figure 1:
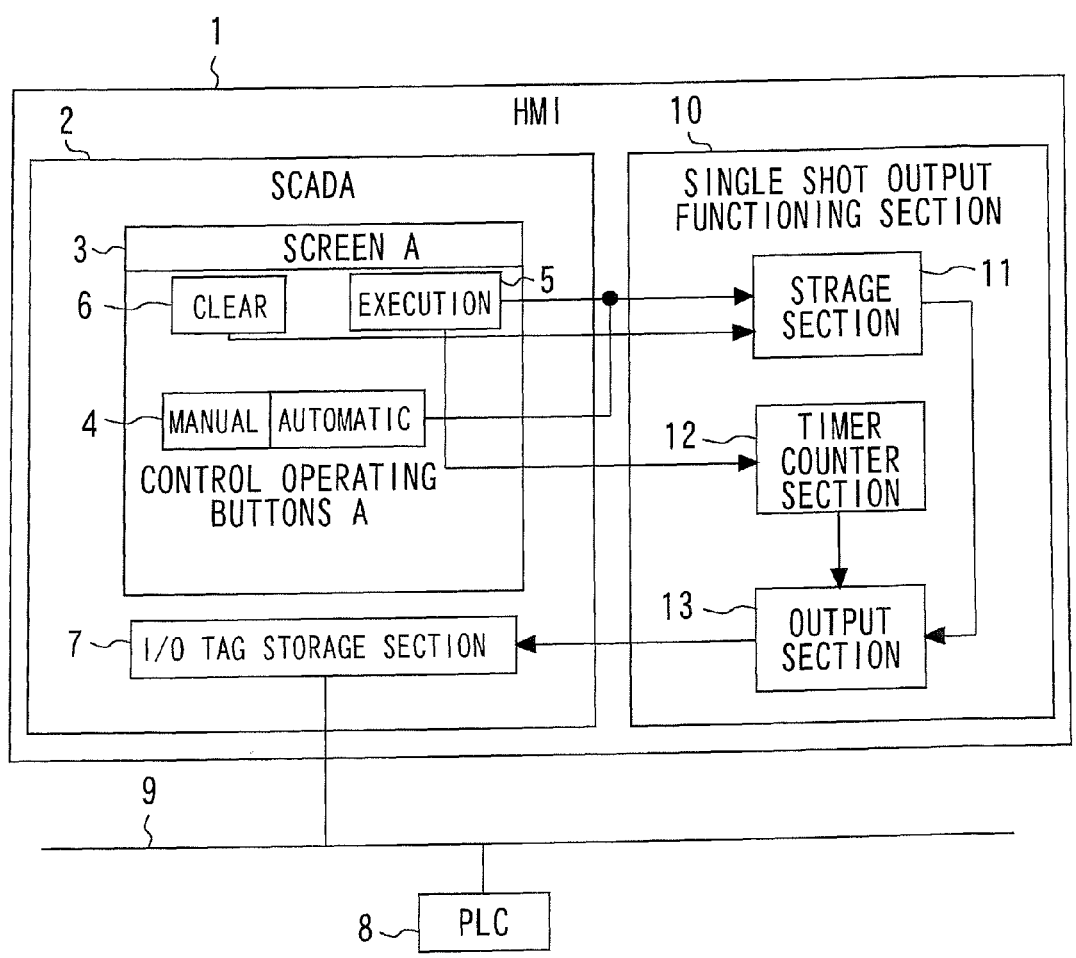
FIG. 1 is a configuration diagram of a plant control system in accordance with a first embodiment of the present invention.

Embodiments for carrying out the present invention will now bed described with reference to the accompanying drawings. In the drawings, the same reference signs are applied to the same or equivalent elements, and the duplicated explanation thereof is simplified or omitted as appropriate.

First Embodiment

FIG. 1 is a configuration diagram of a plant control system in accordance with a first embodiment of the present invention.

Reference sign 1 denotes a supervisory control device (HMI). In this supervisory control device 1, a SCADA (Supervisory Control And Data Acquisition) system 2 is used. On this SCADA system 2, a screen A 3 is displayed. On this screen A 3, buttons corresponding to various control contents of a plant (not shown) are arranged. Specifically, on the screen A 3, control operating buttons A 4 are arranged. The control operating buttons A 4 consist of a manual button and an automatic button. On the screen A 3, an execution button 5 and a clear button 6 are also arranged.

In the SCADA system 2, an I/O tag storage section 7 is provided. In this I/O tag storage section 7, I/O tags are stored. These I/O tags are used as signals for transferring data from and to the outside. Specifically, to the I/O tags are assigned a bit signal, an analog signal, and the like. These I/O tags also include signals corresponding to the control contents of the plant. The number of I/O tags is limited. Also, in the SCADA system 2, an internal tag storage section (not shown) is provided. In this internal tag storage section, internal tags are stored. These internal tags are used as internal signals in the SCADA system 2. The number of internal tags is limited.

Reference sign 8 denotes a programmable logic controller (PLC). This programmable logic controller 8 is provided on the outside of the SCADA system 2. The programmable logic controller 8 has a function of controlling the plant (not shown). Reference sign 9 denotes a scan transmission device. This scan transmission device 9 makes a connection between the I/O tag storage section 7 and the programmable logic controller 8. This connection causes the I/O tags stored in the I/O tag storage section 7 to be delivered to the programmable logic controller 8.

The supervisory control device 1 in accordance with this embodiment is provided with a single shot output functioning section 10 on the outside of the SCADA system 2. This single shot output functioning section 10 has a function of transferring data to and from the SCADA system 2 by using a function for the SCADA system 2. Specifically, the single shot output functioning section 10 includes a storage section 11, a timer counter section 12, and an output section 13.

In the SCADA system 2, functions concerning the names of the I/O tags are written so as to correspond to the control operating buttons A 4. Specifically, the configuration is made such that when the control operating button A 4 is depressed, a signal concerning the sign of I/O tag name and the like corresponding to the control operating button A 4 is delivered to the storage section 11.

In this configuration, at this time, in the case where the I/O tag name concerned is not stored in the storage section 11, that I/O tag name is stored in the storage section 11. On the other hand, in the case where the I/O tag name concerned is stored in the storage section 11, the storage of that I/O tag name is erased from the storage section 11. Thereby, the selection of the control operating button A 4 can be cancelled by re-depressing the control operating button A 4.

Also, in the SCADA system 2, a function that respond to the question of whether or not the I/O tag name is stored in the storage section 11 is written so as to correspond to the control operating button A 4. Specifically, the configuration is made such that the nameplate ("manual" or "automatic") of the control operating button A 4 and the like corresponding to the I/O tag name stored in the storage section 11 is blinked, or the control operating button A 4 is changed to a depressed state. Thereby, the selection state of the control operating buttons A 4 and the like is made apparent to an operator who is operating the SCADA system 2.

Further, in the SCADA system 2, two functions are written so as to correspond to the execution button 5. These two functions consist of a function concerning the erasure of the I/O tag name stored in the storage section 11 and a function concerning the start of a timer of the timer counter section 12. Specifically, the configuration is made such that when a predetermined executing operation is performed on the SCADA system 2, the I/O tag name stored in the storage section 11 is erased. More specifically, when the execution button 5 is depressed, the I/O tag name concerned is erased. Also, the configuration is made such that simultaneously with the erasure of the I/O tag name, the timer counter section 12 starts the counting of the timer setting time preset as certain time. This function is sometimes set so as to transmit the timer setting time as a factor to the timer counter section 12.

Further, in the SCADA system 2, a function concerning the erasure of the I/O tag name stored in the storage section 11 is written so as to correspond to the clear button 6. Specifically, the configuration is made such that when the clear button 6 is depressed, the I/O tag name stored in the storage section 11 is erased.

Next, the operation of the plant control system at the time when the manual button of the control operating buttons A 4 is depressed is explained with reference to FIG. 2.

Figure 2:
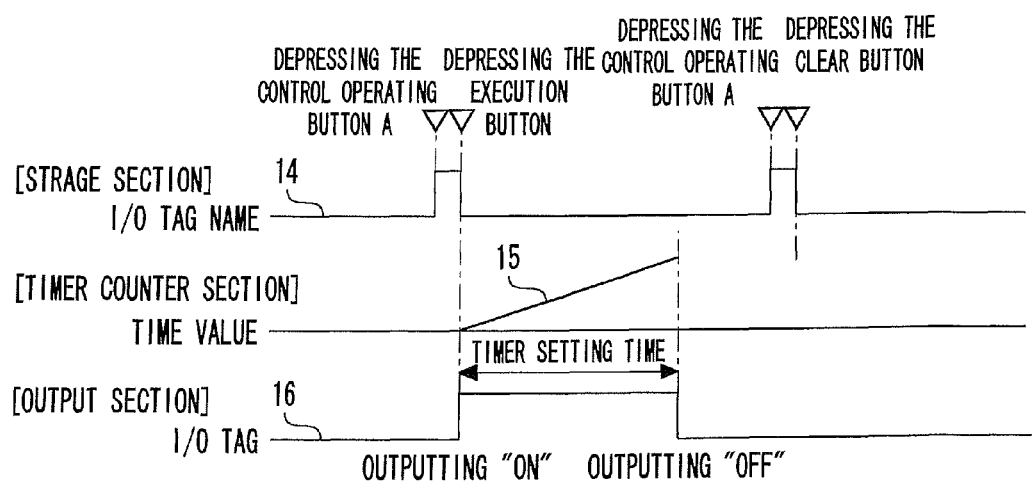
FIG. 2 is a timing chart for explaining the operation of the plant control system in accordance with the first embodiment of the present invention.

FIG. 2 is a timing chart for explaining the operation of the plant control system in accordance with the first embodiment of the present invention.

In FIG. 2, the abscissas represent time. Reference sign 14 denotes the storage state of the I/O tag name corresponding to the manual button. This storage state 14 shows whether or not the I/O tag name corresponding to the manual button has been stored in the storage section 11. Reference sign 15 denotes a timer value. This timer value 15 is used when the certain time is counted by the timer counter section 12. Reference sign 16 denotes an output signal. This output signal 16 is delivered from the output section 13 in response to the manual button.

In FIG. 2, when the manual button of the control operating buttons A 4 is depressed, as shown in the storage state 14, the I/O tag name corresponding to the manual button is stored in the storage section 11. Thereafter, when the execution button 5 is depressed, in the storage section 11, the I/O tag name corresponding to the manual button is erased. Also, simultaneously with this erasure, the timer starts in the timer counter section 12.

Until the timer value 15 reaches the timer setting time, the output section 13 delivers, as an ON signal, the output signal 16 corresponding to the I/O tag name having been stored in the storage section 11 when the counting of the timer setting time was started. When receiving that ON signal, the I/O tag storage section 7 delivers a control I/O tag corresponding to that ON signal to the programmable logic controller 8 via the scan transmission device 9.

The timer setting time is set so as to be not shorter than the time during which the programmable logic controller 8 can surely distinguish the control I/O tag. Therefore, the programmable logic controller 8 holds that control I/O tag. By the holding of that control I/O tag, a state in which the plant can be controlled manually from the supervisory control device 1 is formed.

Subsequently, when the timer value 15 reaches the timer setting time, the output section 13 delivers the output signal 16 as an OFF signal. When receiving that output signal 16 of the OFF state, the I/O tag storage section 7 delivers an erasure I/O tag corresponding to the output signal 16 to the programmable logic controller 8. Then, the programmable logic controller 8 erases the control I/O tag corresponding to that erasure signal. Thereby, the state in which the plant can be controlled manually from the supervisory control device 1 is released.

Subsequently, when the manual button of the control operating buttons A 4 is depressed again, the I/O tag name corresponding to the manual button is stored in the storage section 11. Thereafter, when the clear button 6 is depressed, the I/O tag name corresponding to the manual button is erased from the storage section 11. At this time, in the timer counter section 12, the timer does not start. Therefore, in the output section 13, the output signal 16 corresponding to the I/O tag name is kept in the OFF state. Thereby, a state in which the plant cannot be controlled manually from the supervisory control device 1 is maintained.

According to the first embodiment explained above, the single shot output functioning section 10 is provided on the outside of the SCADA system 2 and on the outside of the programmable logic controller 8. For example, even if manual control is carried out again after the control mode has been changed from manual control to automatic control, the control I/O tag corresponding to the first manual control is automatically erased from the programmable logic controller 8. That is, a single shot output can be carried out to the supervisory control device 1 and the programmable logic controller 8 without the addition of a program concerning the signal transfer between the supervisory control device 1 and the programmable logic controller 8.

Specifically, when the counting of the certain time is started, the output section 13 delivers the ON signal corresponding to the I/O tag name, which is stored in the storage section 11, to the SCADA system 2. When the certain time ends, the output section 13 delivers the OFF signal corresponding to the I/O tag name, which has been stored in the storage section 11 when the counting of the certain time was started, to the SCADA system 2.

The program necessary for the SCADA system 2 is only a function of transferring signals to and from the single shot functioning section 10. Therefore, the SCADA system 2 need not use tags other than the I/O tags to carry out the single shot output. That is, the single shot output can be attained without an increase in the internal tags in the SCADA system 2.

Also, the selected control content can be cleared in response to the clear button 6 merely by writing the function concerning the erasure of the I/O tag name stored in the storage section 11. Therefore, a program having that function need not be provided in the SCADA system 2 and the programmable logic controller 8.

Further, according to this embodiment, in addition to the deletion of the control operating button A 4, the function for transferring signals to and from the single shot output functioning section 10 is also deleted. Also, in the case where the control operating button A 4 and the like are added, the duplication of the button and the change of the I/O tag name written as a function have only to be needed. Therefore, the work for addition/deletion of the control operating button A 4 and the like can be simplified greatly.

Second Embodiment

Figure 3:
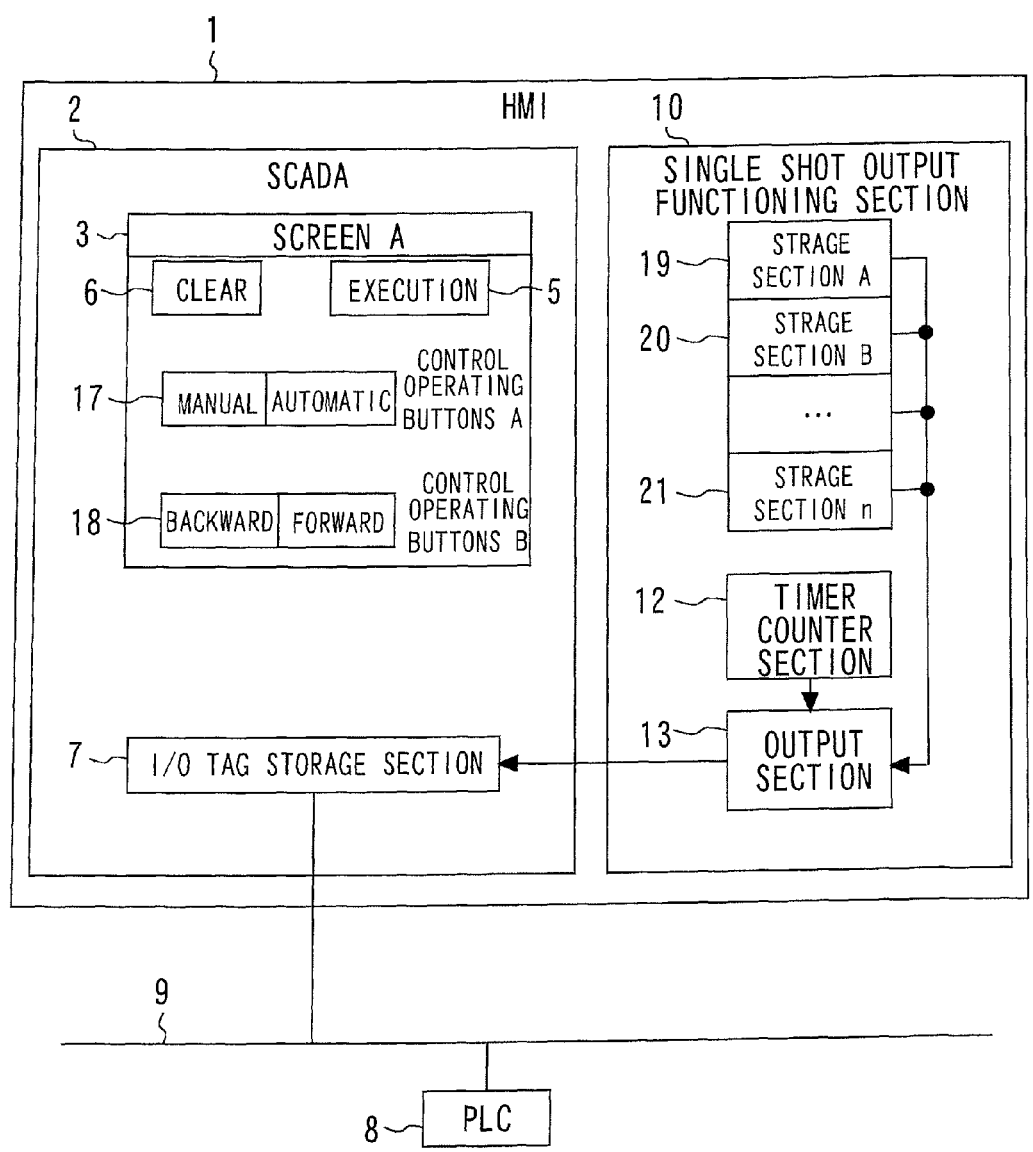
FIG. 3 is a configuration diagram of a plant control system in accordance with a second embodiment of the present invention.

FIG. 3 is a configuration diagram of a plant control system in accordance with a second embodiment of the present invention. The same reference signs are applied to elements that are the same as or equivalent to those in the first embodiment, and the explanation thereof is omitted.

The control operating buttons of the first embodiment are of one kind. On the other hand, the control operating buttons of the second embodiment are of a plurality of kinds.

Specifically, in addition to control operating buttons A 17, control operating buttons B 18, . . . , control operating buttons n (not shown) are provided. Also, the storage section of the single shot output functioning section 10 is provided in plural numbers. Specifically, a storage section A 19 is provided so as to correspond to the control operating buttons A 17. Also, a storage section A 20 is provided so as to correspond to the control operating buttons B 18. Also, a storage section n 21 is provided so as to correspond to the control operating buttons n.

In FIG. 3, the wirings leading from the execution button 5, the clear button 6, the control operating buttons A 17, and the control operating buttons B 18 to the single shot output functioning section 10 are omitted.

Next, the operation of the plant control system is explained with reference to FIG. 4.

Figure 4:
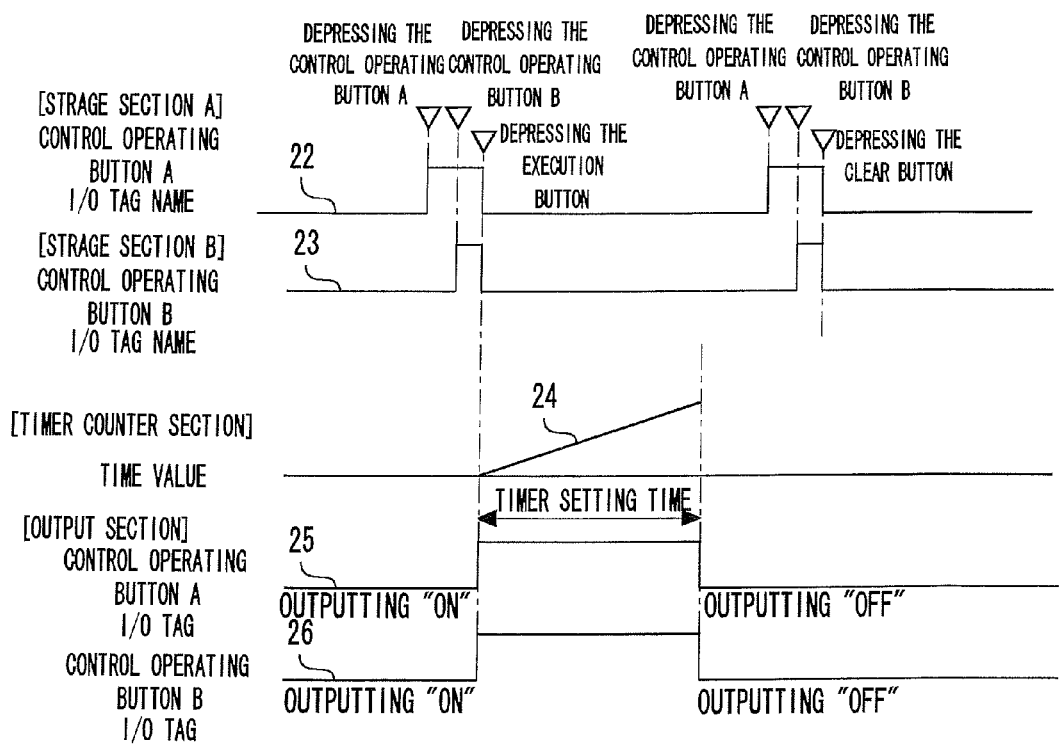
FIG. 4 is a timing chart for explaining the operation of the plant control system in accordance with the second embodiment of the present invention.

FIG. 4 is a timing chart for explaining the operation of the plant control system in accordance with the second embodiment of the present invention.

In FIG. 4, the abscissas represent time. Reference sign 22 denotes the storage state of the I/O tag name corresponding to the control operating buttons A 17. Reference sign 23 denotes the storage state of the I/O tag name corresponding to the control operating buttons B 18. Reference sign 24 denotes a timer value. Reference signs 25 and 26 denote output signals. Specifically, the output signal 25 is a signal delivered from the output section 13 so as to correspond to the control operating buttons A 17. Also, the output signal 26 is a signal delivered from the output section 13 so as to correspond to the control operating buttons B 18.

In FIG. 4, the I/O tag names corresponding to the control operating buttons A 17 and the control operating buttons B 18 are stored in the operation order in the storage section A 19 and the storage section B 20, respectively. That is, when the control operating button A 17 is depressed, as shown in the storage state 22, the I/O tag name corresponding to the control operating button A 17 is stored in the storage section A 19.

Subsequently, when the control operating button B 18 is depressed, as shown in the storage state 23, the I/O tag name corresponding to the control operating button B 18 is stored in the storage section B 20. When the execution button 5 is depressed in this state, in the storage section A 19 and the storage section B 20, the I/O tag names corresponding to the control buttons A 17 and B 18 are erased. Also, simultaneously with this erasure, the timer starts in the timer counter section 12.

Until the timer value 24 reaches the timer setting time, the output section 13 delivers the output signals 25, 26 and so on corresponding to all of the I/O tag names stored in the storage sections A 19 to n 21 synchronously as ON signals. When receiving that ON signal, the I/O tag storage section 7 delivers a control I/O tag corresponding to that ON signal to the programmable logic controller 8 via the scan transmission device 9. Thereby, a state in which the plant can be controlled by the control contents of all of the control I/O tags corresponding to the output signals 25, 26 and so on is formed.

Subsequently, when the timer value 24 reaches the timer setting time, the output section 13 simultaneously delivers the output signals 25, 26 and so on as OFF signals. When receiving those output signals 25, 26 and so on of the OFF state, the I/O tag storage section 7 delivers all erasure I/O tags corresponding to the output signals 25, 26 and so on to the programmable logic controller 8. Thereby, a state in which the plant cannot be controlled by the control contents of the control I/O tags corresponding to the output signals 25, 26 and so on is formed.

Subsequently, when the control operating button A 17 is depressed again, the I/O tag name corresponding to the control operating button A 17 is stored in the storage section A 19. Also, when the control operating button B 18 is depressed, the I/O tag name corresponding to the control operating button B 18 is stored in the storage section B 20. When the clear button 6 is depressed in this state, in the storage sections A 19 to n 21, all of the stored I/O tag names are erased simultaneously. Therefore, in the I/O tag storage section 7, the control I/O tags corresponding to the output signals 25, 26 and so on are not delivered. That is, the state in which the plant cannot be controlled by the control contents of the control I/O tags corresponding to the output signals 25, 26 and so on is maintained.

According to the second embodiment explained above, when the counting of the certain time is started, the output section 13 simultaneously starts the output of the plurality of ON signals corresponding to the plurality of I/O tag names. Also, when the counting of the certain time is finished, the output section 13 simultaneously delivers the plurality of OFF signals corresponding to the plurality of I/O tag names. Therefore, the enlargement of tags in the SCADA system 2 is prevented. Also, a plurality of control contents can be executed in a lump without an intricate I/F program for the SCADA system 2 and the programmable logic controller 8. That is, the operability of plant control is improved.

Third Embodiment

Figure 5:
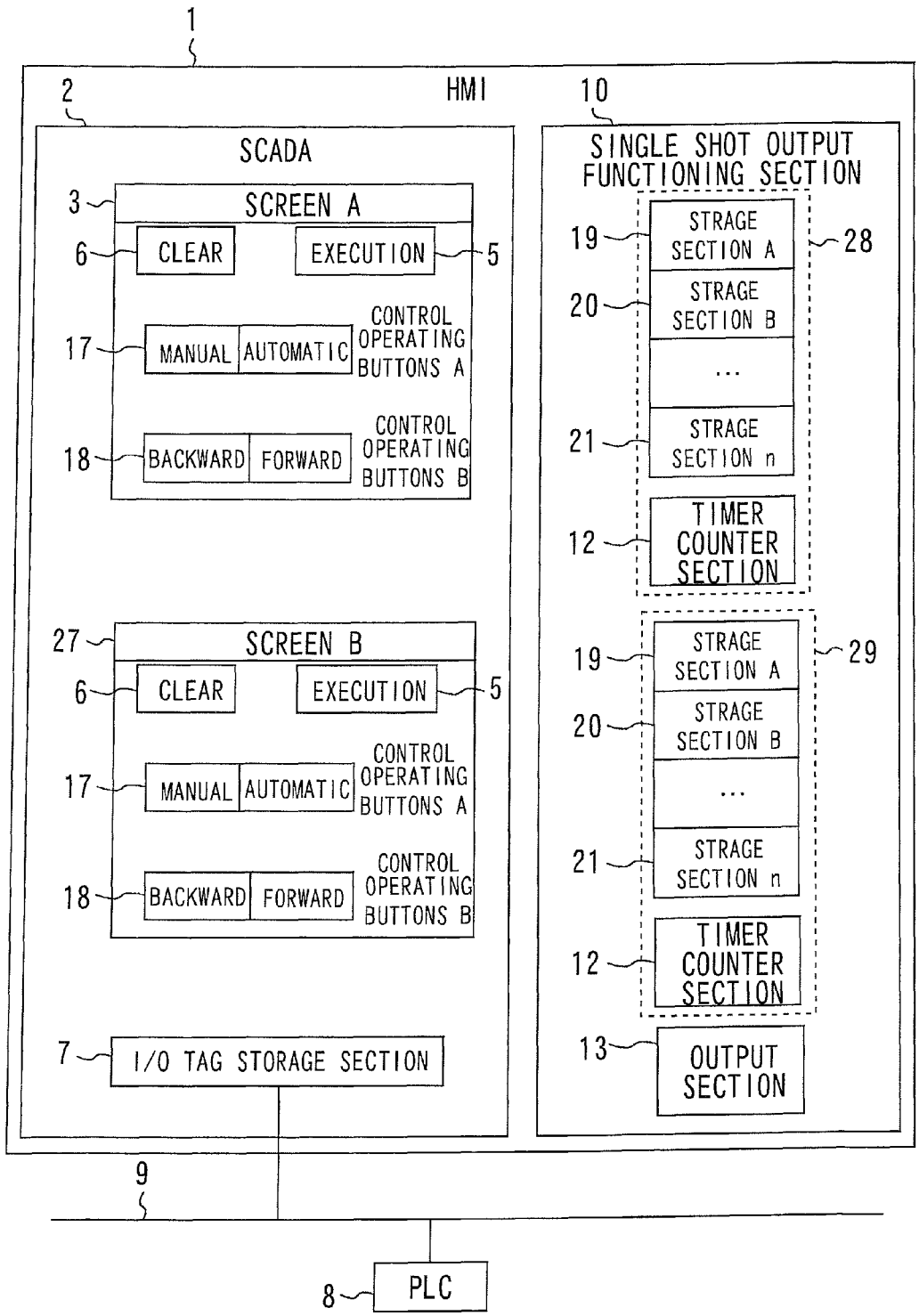
FIG. 5 is a configuration diagram of a plant control system in accordance with a third embodiment of the present invention.

FIG. 5 is a configuration diagram of a plant control system in accordance with a third embodiment of the present invention. The same reference signs are applied to elements that are the same as or equivalent to those in the second embodiment, and the explanation thereof is omitted. The wirings between the SCADA system 2 and the single shot output functioning section 10 are omitted.

The SCADA system 2 of the second embodiment is provided with one screen A 3. On the other hand, the SCADA system 2 of the third embodiment is provided with a plurality of screens. Specifically, the SCADA system 2 is provided with the screen A 3 and a screen B 27. A single shot output functioning section A 28 is provided so as to correspond to the screen A 3. On the other hand, a single shot output functioning section B 29 is provided so as to correspond to the screen B.

Next, the operation of the plant control system is explained with reference to FIG. 6.

Figure 6:
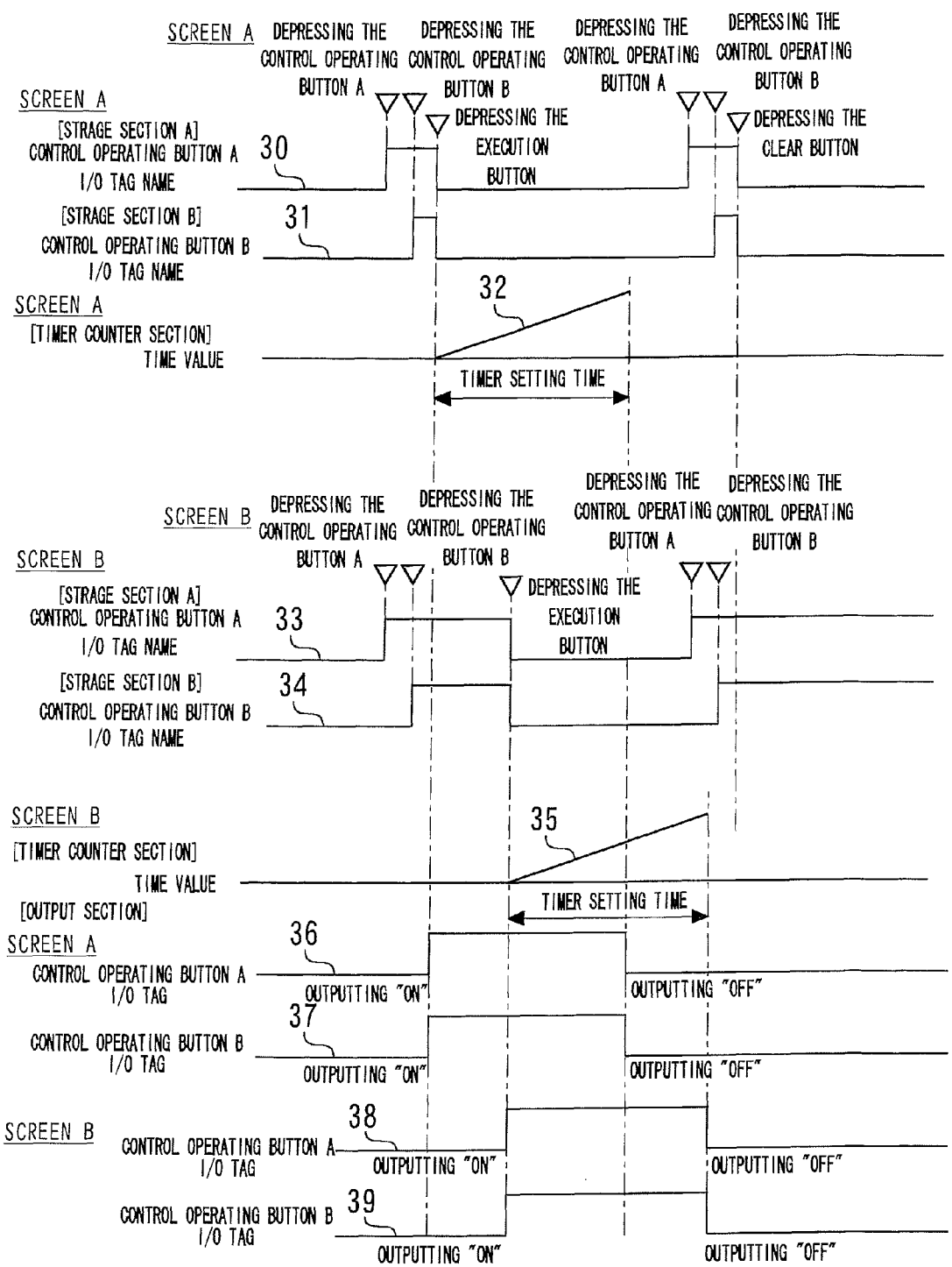
FIG. 6 is a timing chart for explaining the operation of the plant control system in accordance with the third embodiment of the present invention.

FIG. 6 is a timing chart for explaining the operation of the plant control system in accordance with the third embodiment of the present invention.

In FIG. 6, the abscissas represent time. Reference sign 30 denotes the storage state of the I/O tag name corresponding to the control operating buttons A 17 on the screen A 3 side. Reference sign 31 denotes the storage state of the I/O tag name corresponding to the control operating buttons B 18 on the screen A 3 side. Reference sign 32 denotes a timer value in the timer counter section 12 on the single shot output functioning section A 28 side.

Reference sign 33 denotes the storage state of the I/O tag name corresponding to the control operating buttons A 17 on the screen B 27 side. Reference sign 34 denotes the storage state of the I/O tag name corresponding to the control operating buttons B 18 on the screen B 27 side. Reference sign 35 denotes a timer value in the timer counter section 12 on the single shot output functioning section B 29 side.

Reference signs 36 to 39 denote output signals. These output signals 36 to 39 are delivered from the output section 13 so as to correspond to the control operating buttons A 17 on the screen A 3 side, the control operating buttons B 18 on the screen A 3 side, the control operating buttons A 17 on the screen B 27 side, and the control operating buttons B 18 on the screen B 27 side, respectively.

The upper part of FIG. 6 is used to explain the operations of the storage section A 19, the storage section 20, and the timer counter section 12 corresponding to the screen A 3. As shown in the upper part of FIG. 6, the storage section A 19, the storage section 20, and the timer counter section 12 corresponding to the screen A 3 operate in the same way as the second embodiment.

The central part of FIG. 6 is used to explain the storage section A 19, the storage section 20, and the timer counter section 12 corresponding to the screen B. As shown in the central part of FIG. 6, the storage section A 19, the storage section 20, and the timer counter section 12 corresponding to the screen B operate in the same way as the second embodiment independently from the storage section A 19, the storage section 20, and the timer counter section 12 corresponding to the screen A 3.

The lower part of FIG. 6 is used to explain the output section 13 used in common so as to correspond to the screens A 3 and B 27. As shown in the lower part of FIG. 6, the output section 13 operates in the same way as the second embodiment in response to the operation performed on the screen A 3. Further, the output section 13 also operates in the same way as the second embodiment in response to the operation performed on the screen B 27. That is, on account of the operations on the screen A 3 and the screen B 27, the operations of the storage sections A 19 to n 21 and the timer counter section 12 do not interfere with each other. Therefore, the output section 13 can deliver the output signals 36 to 39 so as to normally correspond to the screen A 3 and the screen B 27.

According to the third embodiment explained above, the output section 13 delivers an ON signal and an OFF signal as the output signals 36 to 39 so as to correspond to each of the plurality of screens. Therefore, in the case where a plurality of plants to be controlled are present, the control operation can be performed while developing the screen A 3 and the screen B, so that the operability is improved.

Fourth Embodiment

Figure 7:
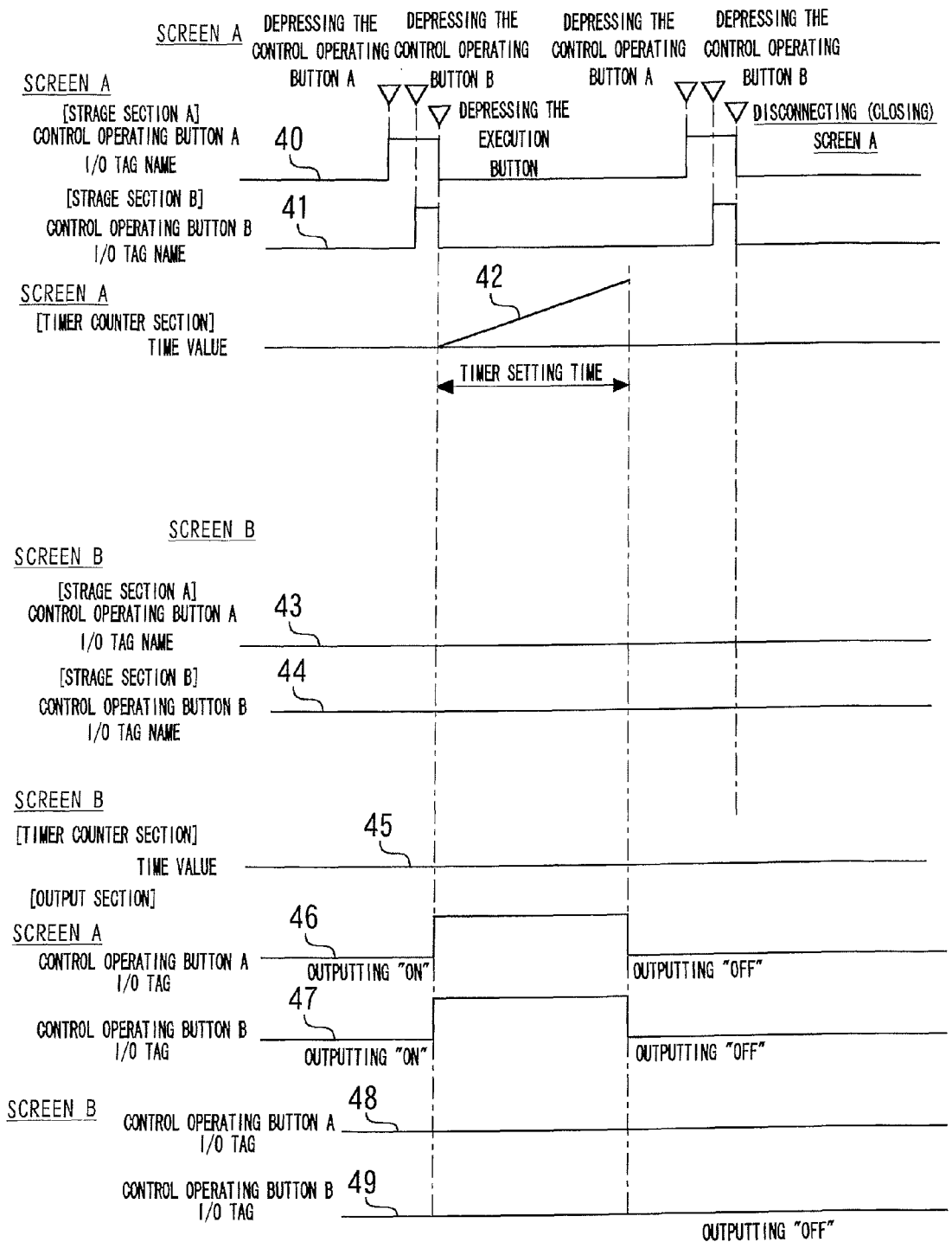
FIG. 7 is the front half part of a timing chart for explaining the operation of the plant control system in accordance with the fourth embodiment of the present invention.
Figure 8:
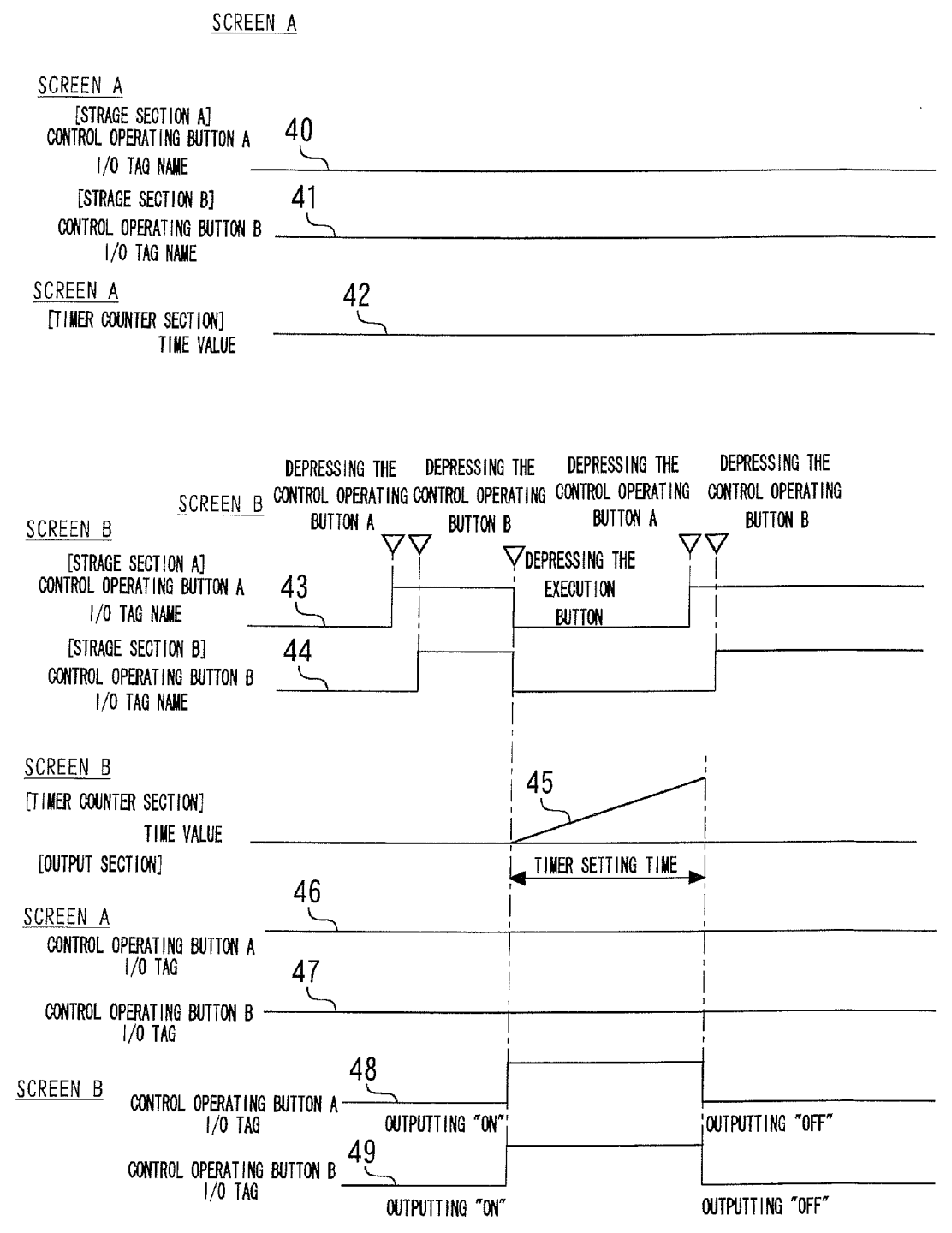

FIG. 7 is the front half part of a timing chart for explaining the operation of the plant control system in accordance with the fourth embodiment of the present invention. FIG. 8 is the rear half part of the timing chart for explaining the operation of the plant control system in accordance with the fourth embodiment of the present invention. The same reference signs are applied to elements that are the same as or equivalent to those in the third embodiment, and the explanation thereof is omitted.

In the third embodiment, the two screens A 3 and B 27 are displayed simultaneously. On the other hand, in the fourth embodiment, the configuration is made such that, among the plurality of screens A 3 and so on, the screen is changed over from a specific screen to another screen. That is, only one screen is displayed on the SCADA system 2 at a certain time.

In such a SCADA system 2, a program that operates at the screen changeover time is written. This program consists of a function for erasing the I/O tag names stored in the storage sections A 19 to n 21 corresponding to the screens to be closed at the screen changeover time.

Next, the operation of the plant control system is explained with reference to FIGS. 7 and 8. In FIGS. 7 and 8, the abscissas represent time. Reference sign 40 denotes the storage state of the I/O tag name corresponding to the control operating buttons A 17 on the screen A 3 side. Reference sign 41 denotes the storage state of the I/O tag name corresponding to the control operating buttons B 18 on the screen A 3 side. Reference sign 42 denotes a timer value in the timer counter section 12 on the single shot output functioning section A 28 side.

Reference sign 43 denotes the storage state of the I/O tag name corresponding to the control operating buttons A 17 on the screen B 27 side. Reference sign 44 denotes the storage state of the I/O tag name corresponding to the control operating buttons B 18 on the screen B 27 side. Reference sign 45 denotes a timer value in the timer counter section 12 on the single shot output functioning section B 29 side.

Reference signs 46 to 49 denote output signals. These output signals 46 to 49 are delivered from the output section 13 so as to correspond to the control operating buttons A 17 on the screen A 3 side, the control operating buttons B 18 on the screen A 3 side, the control operating buttons A 17 on the screen B 27 side, and the control operating buttons B 18 on the screen B 27 side, respectively.

FIG. 7 shows a state in which the screen A 3 is displayed as a specific screen. That is, the screen B 27 is not displayed. Therefore, the control operating buttons A 17 and the like buttons cannot be depressed on the screen B 27. Therefore, the I/O tag name corresponding to the screen B 27 is not stored, and the output signals 48 and 49 corresponding to the screen B 27 do not become ON signals.

As shown on the right upper side of FIG. 7, a case is considered in which in a state in which the I/O tag names corresponding to the control operating buttons A 17 and B 18 corresponding to the screen A 3 are stored, the screen A 3 is closed and changed over to the screen B 27. In this case, all of the I/O tag names 40 and the like stored in the storage sections A 19 to n 21 of the single shot output functioning section A 28 are erased.

FIG. 8 shows a state after the screen has been changed over from the screen A 3 to the screen B. That is, the screen A 3 is not displayed. Therefore, the control operating button A 17 or the like cannot be depressed on the screen A 3. For this reason, the I/O tag name corresponding to the screen A 3 is not stored, and the output signals 46 and 47 corresponding to the screen A 3 do not become ON signals.

According to the fourth embodiment explained above, when the screen is changed over from a specific screen to another screen, the storage section A 19 and the like erase the storage of the I/O tag names corresponding to the control contents selected on the specific screen. Therefore, the control contents having been selected by the operation before screen changeover need not be erased manually. Thereby, the I/O tag corresponding to the control operating button A 17 or the like having been selected before screen changeover can be prevented from being transmitted unintendedly to the programmable logic controller 8. That is, the misoperation of plant to be controlled can be prevented reliably.

INDUSTRIAL APPLICABILITY

As described above, the plant control system in accordance with the present invention can be used for a plant that is subjected to supervisory control using a SCADA system.

DESCRIPTION OF SYMBOLS

1 supervisory control device (HMI),
2 SCADA system,
3 screen A,
4 control operating buttons A,
5 execution button,
6 clear button,
7 I/O tag storage section,
8 programmable logic controller,
9 scan transmission device,
10 single shot output functioning section,
11 storage section,
12 timer counter section,
13 output section,
14 storage state,
15 timer value,
16 output signal,
17 control operating buttons A,
18 control operating buttons,
19 storage section A,
20 storage section A,
21 storage section n,
22,23 storage state,
24 timer value,
25,26 output signal,
27 screen B,
28 single shot output functioning section,
29 single shot output functioning section B,
30,31 storage state,
32 timer value,
33,34 storage state,
35 timer value,
36-39 output signal, \
40,41 storage state,
42 timer value,
43,44 timer value,
46-49 output signal.

The invention claimed is:

1. A plant control system comprising:
    a supervisory control and data acquisition (SCADA) system for providing at least one monitoring screen for monitoring operations of equipment in the plant and for manually controlling, by an operator of the SCADA system, equipment in the plant;
    a programmable logic controller communicating with the SCADA system, receiving and holding instructions, as control signals, from the SCADA system and transferring the instructions received from the SCADA system, to equipment in the plant that is controlled by the SCADA system, to control the equipment; and
    a single shot output functioning section communicating with the SCADA system and which causes the SCADA system to send a control signal to the programmable logic controller, and, after sending of the control signal, to send an erasure signal, erasing the control signal held in the programmable logic controller without execution of a program in the SCADA system that monitors transmission of control signals to the programmable logic controller, wherein the single shot output functioning section is external to the SCADA system and external to the programmable logic controller, the single shot output functioning section comprises:
  a storage section which stores a plurality of I/O tag names corresponding to a plurality of control contents selected by the SCADA system,
  a timer counter section which starts counting of a preset time period when a predetermined executing operation is performed on the SCADA system, and
  an output section which delivers, when the counting of the preset time period has started, a plurality of ON signals, corresponding to the plurality of I/O tag names, sending the control signal, corresponding to the I/O tag name stored in the storage section, to the SCADA system, and delivers, when the counting of the preset time period ends, a plurality of OFF signals, sending the erasure signal, corresponding to the I/O tag name having been stored in the storage section, to the SCADA system, the SCADA system includes a plurality of monitoring screens, when control contents are selected on each of the monitoring screens, the storage section stores the I/O tag names in correspondence with each of the monitoring screens, when an executing operation is performed on each of the monitoring screens, the timer counter section counts the preset time period in correspondence with each of the monitoring screens, and the output section delivers ON signals and OFF signals in correspondence with each of the monitoring screens.

2. The plant control system according to claim 1, wherein, when the storage section stores the I/O tag name corresponding to the control content selected on a first of the monitoring screens of the plurality of monitoring screens, the executing operation is not performed, and, when the monitoring screen changes from the first monitoring screen to another monitoring screen of the plurality of monitoring screens, storage of the I/O tag name corresponding to the control content selected on the first monitoring screen is erased.

* * * * *